A. B. SHAW.
Sewing-Machine Treadle Mechanisms.
No. 147,578. Patented Feb. 17, 1874.
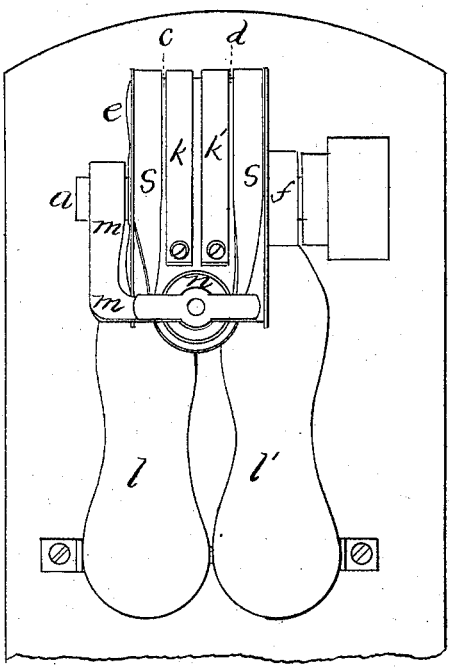
Fig. 1.
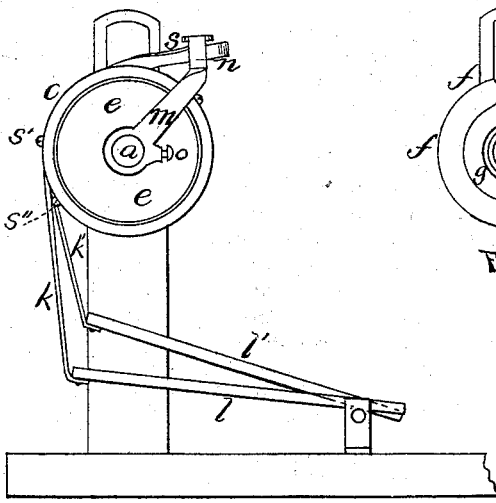
Fig. 2.
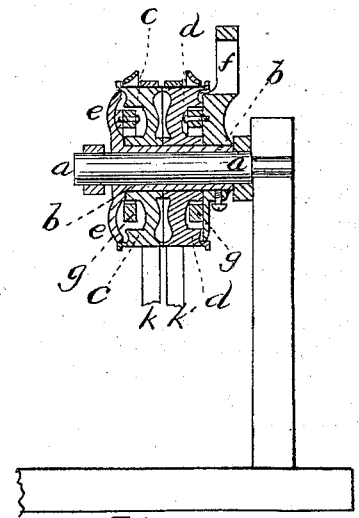
Fig. 3.
Fig. 4.
WITNESSES
INVENTOR
A. B. Shaw
By his Att'ys
Henry W. Williams &c.

UNITED STATES PATENT OFFICE.

AI B. SHAW, OF MEDFORD, MASSACHUSETTS.

IMPROVEMENT IN SEWING-MACHINE TREADLE MECHANISMS.

Specification forming part of Letters Patent No. 147,578, dated February 17, 1874; application filed July 7, 1873.

*To all whom it may concern:*

Be it known that I, AI B. SHAW, of Medford, in the county of Middlesex and State of Massachusetts, have invented a new and valuable Improvement in Connection with Mechanism for Actuating the Driving or Balance Wheels of Sewing-Machines Operated with Treadles, of which the following is a full, clear, and exact description, reference being had to the accompanying drawing and to the letters of reference marked thereon.

This invention is an improvement upon the invention described in the Letters Patent granted to me January 14, 1873, and numbered 134,820. It relates to an arm fixed to the stud, through a pulley in the end of which passes a strap attached at each end, as described below.

In the accompanying drawing, Figure 1 is a plan of treadle mechanism embodying my invention. Fig. 2 is a side elevation of the same. Fig. 3 is a vertical section through the said mechanism. Fig. 4 is an inside view of the clutch, showing the position of the curved pawl and spring within.

Similar letters of reference indicate corresponding parts.

In the drawing, $a$ is the stud upon which loosely turns the balance-wheel. (Not shown in the drawing.) Upon this stud $a$ is placed a hollow sleeve, $b$, upon which turn two pulleys, $c$ $d$. These pulleys are held in place by the head $e$ on the outer end of the sleeve $b$. A clutch, $f$, is fixed, by means of a set-screw, to the inner end of the sleeve $b$, said clutch being intended to embrace the stud or projection always found upon the ordinary sewing-machine balance-wheel, so that they may revolve together. Within a groove in the outer end of each of the pulleys $c$ $d$ is a curved pawl, $g$, one pawl being pivoted to the head $e$, and the other to the clutch $f$, and each pawl being drawn toward the center by the spring $h$. The width of the outer portion $g'$ of the pawl is greater than the distance between the hub and rim of the pulley, and, consequently, as each pulley oscillates back and forth, the outer portion $g'$ of its pawl is wedged between the hub and rim, the motion of the pulley being thus communicated, through the sleeve $b$ and clutch $f$, to the balance-wheel. When the pulley rotates in the opposite direction, the friction of the pawl is relieved, so as to allow the wheel to receive additional impetus in the same direction from the other pulley. The strap $k$ is attached at one end to the pulley $c$, and at the other to the treadle $l$, and the strap $k'$ is attached to the pulley $d$ and treadle $l'$. Attached, by means of a set-screw, $o$, to the stud $a$ is an arm or standard, $m$, having, at its upper extremity, a pulley, $n$, adjusted at a proper angle. Around this pulley $n$ a strap, $s$, passes, and is attached at the end $s'$ to the pulley $d$, and at the end $s''$ to the pulley $c$.

It will readily be seen that when the treadle $l$ is pressed down its strap $k$ pulls over or rotates the pulley $c$. The rotating pulley $c$ draws down the end $s''$ of the strap $s$, while the other end, $s'$, of the strap $s$ is lifted, and consequently carries with it the pulley $d$, which draws up the strap $k'$ and lifts the treadle $l'$, the whole assuming the position shown in Fig. 2. When the treadle $l'$ is depressed, the reverse takes place. Thus the same motion is given to the pulleys $c$ $d$ as described in the Letters Patent alluded to, but in a simpler and more exact manner.

In case a slight variation should occur between the lengths of the straps $k$ $k'$, no trouble would ensue, and there would be no slack, and, of course, any shrinkage would produce no bad effect. The same is true of the strap $s$.

Any equivalent could be used instead of the straps $k$ $k'$, if desired.

There are several advantages which are obtained by holding the pulley $n$ at the end of the standard $m$, instead of attaching pulleys to the table of the machine, as sometimes done. One is that, by moving the standard slightly, the treadles may be elevated or depressed. Another is that the pulley can be adjusted to the exact position which will best accommodate a flat strap. Another is that the strap is very short, and consequently the stretching is not noticed.

Having thus fully described my invention, I do not claim the combination of the two clutch-pulleys $c$ $d$ by means of a strap passing over a pulley or pulleys supported by the table; but

What I claim as my invention is—

The pulley $n$, held in position by means of the standard $m$, fixed to the stud $a$, substantially as specified.

AI B. SHAW.

Witnesses:
HENRY W. WILLIAMS,
B. W. WILLIAMS.